US008014524B2

(12) United States Patent
Ryan

(10) Patent No.: US 8,014,524 B2
(45) Date of Patent: *Sep. 6, 2011

(54) SCALING INDEPENDENT TECHNIQUE FOR WATERMARKING IMAGES WITH RECORDER SHUT-OFF

(75) Inventor: John O. Ryan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,291

(22) Filed: Jun. 14, 2010

(65) Prior Publication Data

US 2010/0246882 A1  Sep. 30, 2010

Related U.S. Application Data

(63) Continuation of application No. 10/703,681, filed on Nov. 7, 2003, now Pat. No. 7,764,790, which is a continuation of application No. 09/369,642, filed on Aug. 6, 1999, now abandoned.

(51) Int. Cl.
| | |
|---|---|
| H04N 7/167 | (2011.01) |
| H04L 9/32 | (2006.01) |
| H04N 7/08 | (2006.01) |
| G06T 1/00 | (2006.01) |
| G06F 12/00 | (2006.01) |
| G06Q 30/00 | (2006.01) |
| G06Q 10/00 | (2006.01) |

(52) U.S. Cl. ........ 380/201; 380/202; 380/232; 713/176; 713/177; 713/179

(58) Field of Classification Search .......... 380/201
See application file for complete search history.

(56) References Cited

U.S. PATENT DOCUMENTS

| 5,765,152 | A * | 6/1998 | Erickson | 1/1 |
| 6,229,924 | B1 * | 5/2001 | Rhoads et al. | 382/232 |
| 6,360,000 | B1 * | 3/2002 | Collier | 382/100 |

FOREIGN PATENT DOCUMENTS

| GB | 2 374 478 A | 10/2002 |
| WO | WO-97/13248 A1 | 4/1997 |
| WO | WO 03088146 A2 * | 10/2003 |

OTHER PUBLICATIONS

Bloom, J.A.; Cox, I.J.; Kalker, T.; Linnartz, J.-P.M.G.; Miller, M.L.; Traw, C.B.S.; "Copy protection for DVD video"; Proceedings of the IEEE vol. 87, Issue: 7; Digital Object Identifier: 10.1109/5.771077; Publication Year: Jul. 1999, pp. 1267-1276.*
Japanese Office Action mailed on Mar. 3, 2009, for Japanese Application No. 2001-515630, filed Jan. 30, 2002, three pages. (English Translation).
Memon, N. et al. (Jul. 1998). "Protecting Digital Media Content," Communication of the ACM 41(7):34-43.

* cited by examiner

Primary Examiner — Michael Pyzocha
Assistant Examiner — Courtney D Fields
(74) Attorney, Agent, or Firm — Morrison & Foerster LLP

(57) ABSTRACT

A robust technique to prevent illicit copying of video information notwithstanding the use of image scaling. A watermark is embedded into the video signal (e.g., DVD's content or other video sources) at different scales (i.e., sizes). The watermark is maintained at each scale for a predetermined time duration that is sufficient to allow the detector circuit in a DVD-recorder, DVHS recorder, DVCR, or any other digital format recorder to detect, extract, and process information contained in the watermark. At the end of the predetermined time duration, the watermark is changed to a different scale preferably on a pseudo-random basis to ensure that each one of all the scales in a predetermined scaling range is achieved a predetermined number of times. Thereby the recorder shuts off a number of times during play of the content, each time the detector circuit senses the watermark.

28 Claims, 3 Drawing Sheets

SCALING INDEPENDENT TECHNIQUE FOR WATERMARKING IMAGES WITH RECORDER SHUT-OFF

CROSS-REFERENCE TO RELATED APPLICATION

This application is a continuation of U.S. application Ser. No. 10/703,681 filed Nov. 7, 2003, now U.S. Pat. No. 7,764,790 which in turn is a continuation of U.S. application Ser. No. 09/369,642 filed Aug. 6, 1999, now abandoned, both incorporated herein by reference in their entirety.

FIELD OF THE INVENTION

The invention generally relates to copy protection and more particularly to a method to prevent the circumvention of watermarking copy protection by image scaling.

BACKGROUND OF THE INVENTION

Digital Versatile Discs (DVDs), which are a derivative of Compact Discs (CDs), are becoming increasingly popular as a media format for storing digital video and audio data. For reasons including greatly improved video and audio quality as well as improved reliability, the DVD format is gradually replacing the Video Home System (VHS) tape format as the preferred format for storing home video contents such as movies, etc. The technical superiority that makes DVDs attractive to the consumers also poses great concerns to the copyrighted content owners of the DVDs such as movie studios. This is because unlike analog copies, which are noticeably inferior to the original, a digital copy can be substantially similar in terms of video and audio quality to the original thereby making the unauthorized copying of the DVD contents too tempting to the average consumers. Such temptation can easily be realized once DVD-recorders, Digital-VHS (DVHS) recorders, Digital Video Cassette Recorders (DVCRs), and other digital format recorders which are now available for professional users, are made available at an affordable price to the average consumers in the not-too-distanced future.

A proposed solution to the problem of unauthorized copying (analog or digital) involves embedding hidden authentication information (e.g., a unique serial number, a transaction identifier, etc.) or hidden copy protection information (e.g., a copyright notice or others) in the original video during production. The hidden authentication and copy protection information, which may commonly be referred to as watermarks, are imperceptible to the naked eye but may be detected using special circuitry and/or algorithms. The watermarks are embedded in the naturally occurring variations throughout an image and may be sufficiently robust to survive multiple generations of copying, modification, and compression. In its simplest implementation which is therefore easiest to detect and compromise, the watermark is appended to the original video as headers and trailers. In more sophisticated implementations, the watermark is distributed throughout the original video making it much more difficult to identify and eliminate the watermark. To prevent the illicit digital copying of DVDs, all DVD-recorders, DVHS recorders, DVCRs, and other digital format recorders conforming to this copy protection method include a detector capable of detecting the watermark embedded in the digital or analog video transmitted from a DVD-player playing a DVD or other video sources. Whenever such watermark is detected in the digital data stream, these DVD-recorders, DVHS recorders, DVCRs, and other digital format recorders are designed to shut themselves off thereby halting the illicit copying attempt.

However, an image scaling (i.e., sizing) feature may be soon made available as a standard feature in all DVD players to allow the physical scaling of the DVD video image. When the DVD video image is scaled up or down relative to a standard scale, a watermark may not be detected by DVD-recorders, DVHS recorders, DVCRs, and other digital format recorders. The reason is that a watermark is typically detected using predetermined X-Y coordinates relative to the horizontal and vertical sync pulses. Since the position and size of the watermark vary directly relative to image scaling, the predetermined X-Y coordinates may no longer be accurate in locating the watermark. Referring now to FIGS. 1A-1C illustrating as examples the variations in terms of position and size of an exemplary watermark due to image scaling. FIG. 1A illustrates as an example the position (X,Y) and size (H,W) of exemplary watermark 102 relative to video image 101 and monitor screen 100 when video image 101 and watermark 102 are at a standard scale. FIG. 1B illustrates as an example the position and size of watermark 102 relative to video image 101 and monitor screen 100 when video image 101 and watermark 102 are at an arbitrary enlarged scale such that video image 101 fills up all of monitor screen 100. As shown in FIG. 1B, in addition to being enlarged in size (H1,W1), the location (X1,Y1) of watermark 102 has been shifted relative to its previous positions shown in FIG. 1A. FIG. 1C illustrates as an example the position and size of watermark 102 relative to video image 101 and monitor screen 100 when video image 101 and watermark 102 are at a reduced scale. As shown in FIG. 1C, in addition to being reduced in size (H2,W2), the location (X2,Y2) of watermark 102 has been shifted relative to its previous positions shown in FIGS. 1A and 1B.

As demonstrated by FIGS. 1A-1C above, the changes in position of a watermark due to image scaling may cause a watermark to go undetected. If the watermark is not detected by DVD-recorders, DVHS recorders, and DVCRs, they will not automatically shut off to prevent illicit copying thereby rendering the aforementioned method ineffective.

Thus, a need exists for a robust technique to prevent illicit digital copying of DVDs and other video sources using image scaling during the copying process without requiring added complex and costly hardware in the DVD-recorders, DVHS recorders, and DVCRs.

SUMMARY OF THE INVENTION

Accordingly, the present invention provides a technique to prevent illicit digital copying of DVDs and other video sources using image scaling during the copying process without requiring added complex and costly hardware in the DVD recorders, DVHS recorders, and DVCRs.

The present invention meets the above need with a robust method to prevent illicit copying of video information such as DVD, digital broadcast video signal, etc. notwithstanding the use of image scaling. In accordance with the present invention, a range of scales that a pirate is likely to use in image scaling is determined. Such a range of scales can be, for example, based on the picture quality such as loss of image details around the edges. Using this range of scales, a watermark having different scales is embedded into a video information stream according to a pattern. In particular, a watermark having a standard scale selected from the range of scales is first embedded in the video information stream for a first time period. During or at the end of the first time period, the watermark having another scale selected from the range of scales is embedded in the video stream for a second time period. The count of scales utilized is monitored. Using a different scale, the watermark is embedded. This pattern is repeated until the count reaches N number of scales. The objective of the present invention is that a watermark having an "inverse" scale can be identified and used to counter the effects of image scaling and restore the watermark to its original size and location thereby making it detectable by a typical watermark detector. Such detection triggers a recorder to shut off during an illicit duplication.

In one embodiment, for every 20 second interval, a watermark having a standard scale is embedded for 5 seconds to be followed by 3 watermarks with different scales for the next 3 5-second intervals. In so doing, the watermark having the standard scale is embedded throughout approximately ¼ of the duration of the video information and the watermark having other selected scales is embedded throughout the remaining duration of the video information. This ensures that any illicit duplication regardless of what image scale is used will be interrupted by a predetermined number of times throughout the duration of the video information. As an alternative embodiment, each selected scale is used in scaling the embedded watermark for a predetermined number of times thereby assuring that the digital recorder is shut-off that number of times.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well-known methods, procedures, components, and circuits have not been described in detail as not to unnecessarily obscure aspects of the present invention. Although the following description describes the present invention in the context of preventing illicit copying of DVDs, it should be clear to a person of ordinary skill in the art that the present invention can be used to prevent the illicit copying of any type of video information (analog or digital) from any video source (e.g., broadcast or cable-delivered video signal, video recorder, or others) to any digital format recorder.

In accordance with the present invention, the watermark is embedded by a watermark embedder during production into the DVD's content at different scales (i.e., sizes). The watermark is maintained at each scale for a time duration that is sufficient to allow the detector circuit in a DVD recorder, DVHS recorder, DVCR, or any other digital format recorder to detect, extract, and process information contained in the watermark. During or at the end of a first time duration, the watermark is changed to a different scale (preferably on a pseudo-random basis) to ensure that each one of all the scales in a scaling range is achieved N number of times. In the preferred embodiment, the watermark is scaled to a standard scale (i.e., default scale) for a total duration that is approximately 1% of the DVD's play length and at non-standard scales for the remainder of the DVD's play length. By ensuring that the watermark is scaled to substantially all values in a predetermined range, a particular scale that has the counter effect of restoring the watermark to its original position (relative to an absolute reference such as horizontal and vertical syncs) and size can be identified and used to allow the watermark to be detected by the detector resided in the DVD-recorder, DVHS recorder, DVCR, or other digital format recorders. Such detection is used by the digital format recorder to turn itself off thereby preventing illicit copying.

Figure 1A:
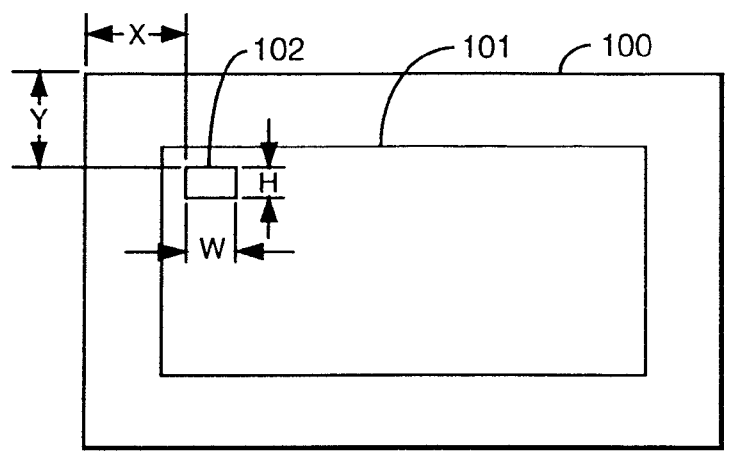
FIG. 1A illustrates as an example the position (X,Y) and size (H,W) of exemplary watermark 102 relative to video image 101 and monitor screen 100 when video image 101 and watermark 102 are at a standard scale
Figure 1B:
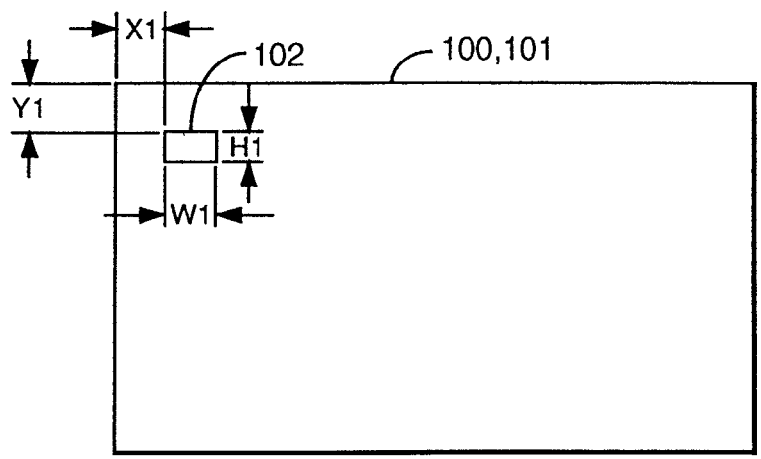
FIG. 1B illustrates as an example the position and size of watermark 102 relative to video image 101 and monitor screen 100 when video image 101 and watermark 102 are at an arbitrary enlarged scale such that video image 101 fills up all of monitor screen 100.
Figure 1C:
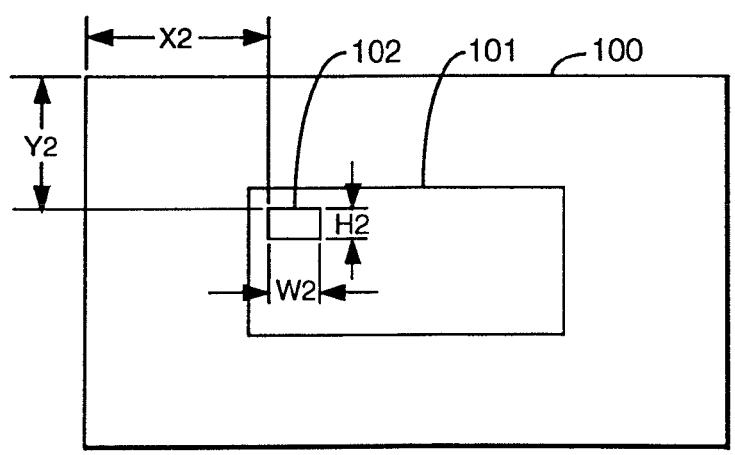
FIG. 1C illustrates as an example the position and size of watermark 102 relative to video image 101 and monitor screen 100 when video image 101 and watermark 102 are at a reduced scale.
Figure 2A:
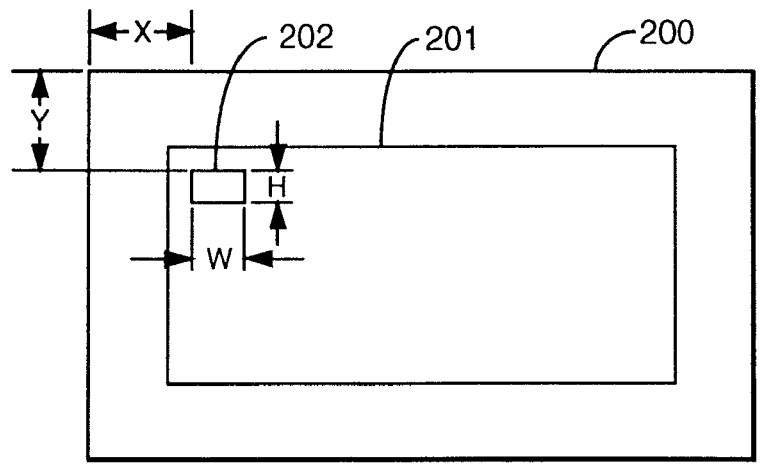
FIG. 2A illustrates as an example the position (X,Y) and size (H,W) of exemplary watermark 202 relative to video image 201 and monitor screen 200 when video image 201 and watermark 202 are both at a standard scale.
Figure 2B:
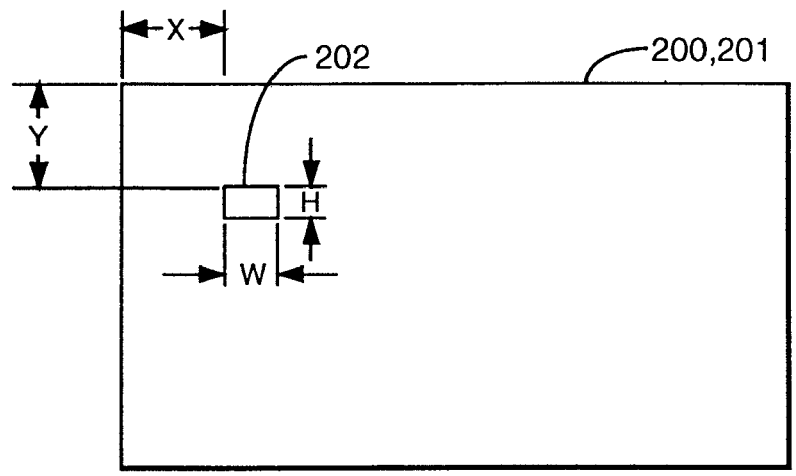
FIG. 2B illustrates as an example the position and size of watermark 202 relative to video image 201 and monitor screen 200 when video image 201 is at an arbitrary enlarged scale such that video image 201 fills up all of monitor screen 200 and watermark 202 is at a reduced scale that provides the counter effect of restoring the watermark to its original position and size in accordance with the present invention.
Figure 2C:
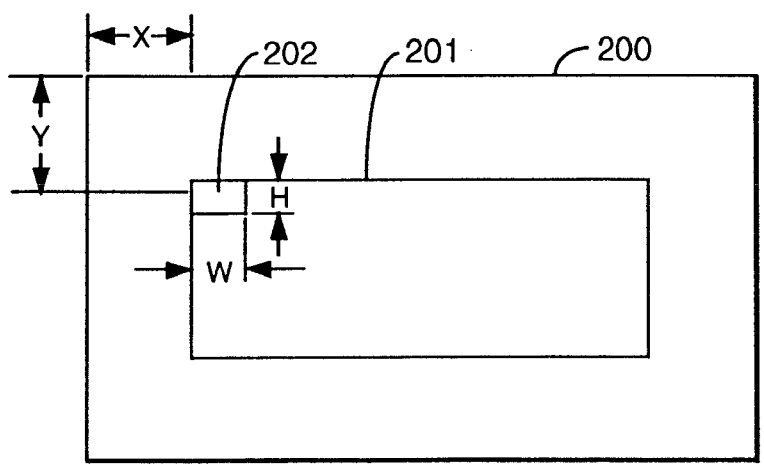
FIG. 2C illustrates as an example the position and size of watermark 202 relative to video image 201 and monitor screen 200 when video image 201 is at an arbitrary reduced scale and watermark 202 is at an enlarged scale that provides the counter effect of restoring the watermark to its original position and size in accordance with the present invention.

Reference is now made to FIGS. 2A-2C illustrating as examples the counter effects of watermark scaling relative to image scaling in accordance with the present invention. FIG. 2A illustrates as an example the position (X,Y) and size (H,W) of exemplary watermark 202 relative to video image 201 and monitor screen 200 when video image 201 and watermark 202 are both at a standard scale. A standard scale value is a default value that is predetermined by Original Equipment Manufacturers (OEMs) of DVD-recorders, DVHS recorders, DVCRs, or other digital format recorders. FIG. 2B illustrates as an example the position and size of watermark 202 relative to video image 201 and monitor screen 200 when video image 201 is at an arbitrary enlarged scale such that video image 201 fills up all of monitor screen 200 and watermark 202 is at a reduced scale that provides the counter effect of restoring the watermark to its original position and size. As shown in FIG. 2B, despite the enlarged size of video image 201, watermark 202 has been restored to its original position (X,Y) and size (H,W) shown in FIG. 2A. FIG. 2C illustrates as an example the position and size of watermark 202 relative to video image 201 and monitor screen 200 when video image 201 is at an arbitrary reduced scale and watermark 202 is at an enlarged scale that provides the counter effect of restoring the watermark to its original position and size. As shown in FIG. 2C, despite the reduced size of video image 201, watermark 202 has been restored to its original position (X,Y) and size (H,W) shown in FIG. 2A.

As demonstrated in FIGS. 2A-2C, to restore the watermark to its original position and size, the watermark scaling is "inversely" related to the image scaling. For example, if the image is enlarged by +10%, the watermark needs to be reduced by −10% if its position and size are to be restored to their original values. Similarly, if the image is reduced by −10%, the watermark needs to be enlarged by +10% if its position and size are to be restored to their original values. Accordingly, it is desirable under the present invention to make sure that the watermark is scaled a predetermined number of times at substantially all possible values in a scaling range so that a particular "inverse" scaling value can be identified and used by the watermark to counter the effects of image scaling to bypass the watermark by a DVD content pirate.

In the preferred embodiment, a scaling range of ±20% relative to the standard scale is implemented. Empirical data indicates that an enlargement of greater than +20% relative to the standard scale is likely to cause significant details to be lost around the edges of an image and is therefore, not likely to be implemented for illicit copying. Similarly, a reduction of greater than −20% relative to the standard scale is likely to cause an undesirable big black border around the image as well as to make an image too small for viewing and is therefore, not likely to be implemented for illicit copying. However, it is to be appreciated that other scaling ranges may be used and still be within the scope of the present invention. Because a typical watermark detector has a resolution of ±0.25%, a scaling step of ±0.4% is implemented in the preferred embodiment to provide a margin against overlapping. It is to be appreciated that other scaling steps may be employed as well and that a variable scaling step can also be implemented in the present invention. With a scaling range of ±20% and a scaling step of ±0.4%, there are a total of 100 non-standard scales in the preferred embodiment. From these, it is highly likely that one of the non-standard scales will be the "inverse" to the scale that is used in image scaling. As discussed above, when the watermark is scaled by such "inverse" scale factor, the location and size of the watermark is restored to its original value thereby allowing the watermark detector to detect the watermark.

Moreover, a typical watermark detector requires as much as 5 seconds to detect, extract, and process the information in an embedded watermark. As such, each scaling step needs a minimum duration of 5 seconds in the preferred embodiment. It is to be appreciated that this minimum duration is subject to change as improved watermark detectors are introduced. In the preferred embodiment, it is also desirable for the watermark to have a standard scale for ¼ of the DVD total play length. This is designed to provide the sufficient number of interruptions (i.e., recorder shut-off) to discourage illicit copying in the event no image scaling feature is available in the DVD recorder, DVHS recorder, DVCR, or other digital format recorder. The remaining ¾ of the DVD total play length is dedicated to the other (100) non-standard scales. It should be clear to a person of ordinary skill in the art that other ratios can also be used. As an example, for a 2 hour long movie, there are 360 times (1800seconds/5seconds=360) that a standard scaled watermark appears and 1080 times (5400seconds/5seconds=1080) that a non-standard scaled watermark appears through out the movie. Because there are 100 non-standard scales, the watermark appears at each non standard scale at least 10 times through out the movie. This means that there are at least 10 interruptions in an illicit copying attempt each of which requires a pirate to get up, rewind the discs, adjust the image scaling to a new scale value, and then push record. Such a major inconvenience likely discourages most home illicit copying attempts.

Figure 3:
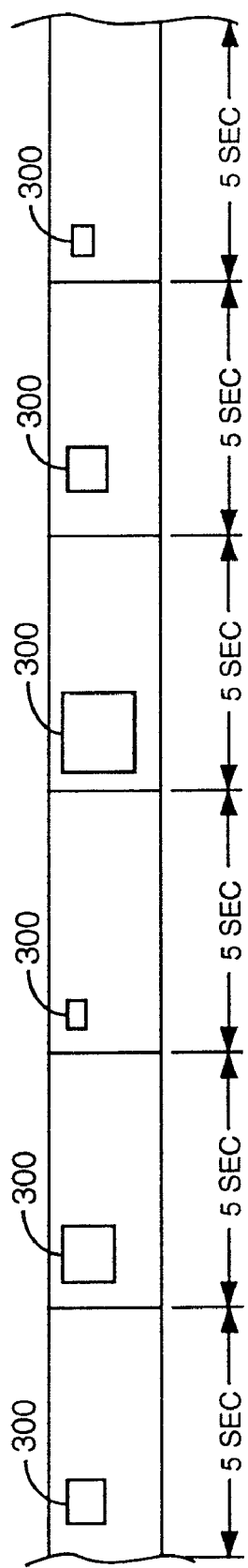
FIG. 3 provides an illustration of a preferred watermark distribution pattern in accordance with the present invention.

In the preferred embodiment, to evenly distribute the standard scaled watermark throughout the movie, for every 20 second interval, a standard scaled watermark is embedded into the video/audio data content of the DVD for 5 seconds followed by 3 5-second or other duration periods of arbitrary nonstandard scaled watermarks. The pattern is then repeated for the next 20 second interval but with different scales selected for the non-standard scaled watermarks. The non-standard scaled watermarks are randomly selected for each movie to make it difficult to determine where in what movie a particular watermark scale occurs. This pattern is based on the ratio of the total duration of embedded standard scaled watermark versus non-standard scaled watermarks. FIG. 3 provides an illustration of this watermark distribution pattern. In FIG. 3, a sequence of video data frames along a time line (representing DVD content information or other video sources) are illustrated wherein a watermark is shown embedded into each data frame. For convenience, each data frame is assumed to have a duration of 5 seconds. As shown in FIG. 3, the watermark 300 sizes are different between frames. The first data frame has a watermark at a standard scale and the subsequent frames have watermarks with randomly different scales. This pattern is repeated throughout the duration of the video information (e.g., DVD's content length or other video sources).

It is to be appreciated that other patterns are also within the scope of the present invention. Because the standard scaled and non-standard scaled watermarks are embedded into a DVD or any other video sources during its production by a professional watermark embedder, no additional hardware is required in a recorder which greatly reduces the cost of the recorder thereby making it more attractive for recorder OEMs to participate in a proposed copyright protection scheme. It should be clear to a person of ordinary skill in the art that the watermark embedding process is well-known and the watermark embedders used for this process are well-known and readily available commercially. As such, they are not further discussed here for simplicity sake. Because a professional watermark embedder costs a few thousand dollars, any costs imposed by the present invention to these machines are insignificant.

The preferred embodiment of the present invention, a technique to prevent illicit copying of video information such as DVDs or other video sources notwithstanding the use of image scaling, is thus described. While the present invention has been described in particular embodiments, the present invention should not be construed as limited by such embodiments, but rather construed according to the below claims.

What is claimed is:

1. A method to prevent illicit copying of video information comprising:
   a) embedding a watermark, with a watermark embedder, having a first scale selected from a range of scales in the video information for a first time period;
   b) during or at the end of the first time period, embedding a watermark, with the watermark embedder, having another scale selected from the range of scales in the video information for a second time period; and
   c) repeating step (b) using a different scale until each of the scales is used a predetermined number of times;
   whereby the watermark is restored to a position and size detectable by a typical watermark detector at least the predetermined number of times.

2. The method of claim 1 further comprising repeating steps (a) to (c) throughout part or all of the duration of the video information.

3. The method of claim 2, wherein the watermark having the first scale is embedded throughout approximately ¼ of the duration of the video information and the watermarks having other scales are embedded throughout the remaining duration of the video information.

4. The method of claim 1, wherein each of the scales is pseudo-randomly selected.

5. The method of claim 1, wherein each of the scales is randomly selected.

6. The method of claim 2, wherein the range of scales is ±20 percent relative to the first scale.

7. The method of claim 1, wherein the number of scales corresponds to the range of the scales and watermark detection resolution of the watermark detector.

8. The method of claim 2, wherein the first time period corresponds to the time required by the watermark detector to detect, extract, and process the watermark.

9. The method of claim 1, wherein the source of the video information is a Digital Versatile Disc (DVD).

10. The method of claim 1, wherein the source of the video information is broadcast, the Internet or cable.

11. The method of claim 1, wherein the first time period is substantially the same length as the second time period.

12. The method of claim 1, wherein the first time period is different in length from the second time period.

13. The method of claim 1, wherein in the second time period the video information is not scaled by the another scale.

14. The method of claim 1, wherein the watermark detector is of the type in a digital recorder and each detection of the watermark interrupts recording.

15. A method to provide watermarked video, comprising:
  a) providing a video stream;
  b) providing a watermark;
  c) in a first time period, embedding the watermark, with a watermark embedder, having a first scale in the video stream;
  d) in a second subsequent time period, embedding the watermark, with the watermark embedder, having another second scale in the video stream without scaling the video stream by the second scale;
  e) in a third subsequent time period, embedding the watermark, with the watermark embedder, having another third scale in the video stream without scaling the video stream by the third scale; and
  f) repeating steps (c), (d), and (e) a predetermined number of times;
  whereby upon playback of the video stream with the embedded watermarks, a scaling of the video stream results in at least one of the embedded watermarks being restored to a predetermined size and location in the video stream; whereby at the predetermined size and location the watermark is detectable by a typical watermark detector at least the predetermined number of times.

16. The method of claim 15, further comprising in subsequent time periods embedding the watermark in the video stream.

17. The method of claim 16, wherein the watermark having the first scale is embedded in approximately ¼ of the duration of the video stream and the watermarks having the other scales are embedded in a remaining duration of the video stream.

18. The method of claim 16, wherein each of the scales is pseudo-randomly selected.

19. The method of claim 15, wherein each of the scales is randomly selected.

20. The method of claim 15, wherein the range of the second and third scales is ±20 percent relative to the first scale.

21. The method of claim 15, further comprising predetermining the total number of scales.

22. The method of claim 15, wherein a duration of each time period corresponds to the time required by the watermark detector to detect, extract, and process the watermark.

23. The method of claim 15, wherein the source of the video stream is a Digital Versatile Disc (DVD).

24. The method of claim 15, wherein the source of the video stream is broadcast or cable-delivered video signals.

25. The method of claim 15, wherein the first time period is substantially the same length as the second time period.

26. The method of claim 15, wherein the first time period is different in length from a subsequent one of the time periods.

27. The method of claim 15, wherein the watermark detector is of the type in a digital recorder, and each detection of the watermark interrupts recording.

28. A method of embedding a plurality of watermarks in a video signal, comprising:
  a) embedding a watermark, with a watermark embedder, having a first scale selected from a range of scales in the video signal for a first time period;
  b) during or at the end of the first time period, embedding a watermark, with the watermark embedder, having another scale selected from the range of scales in the video signal for a second time period;
  c) repeating step (b) using a different scale until a predetermined number of scales is reached; and
  d) repeating steps (a), (b) and (c) a predetermined number of times.

* * * * *